United States Patent [19]

Okada

[11] 4,228,840
[45] Oct. 21, 1980

[54] SAFETY WHEEL

[75] Inventor: Motohiro Okada, Asaka, Japan

[73] Assignee: Honda Giken Kogyo Kabushiki Kaisha, Tokyo, Japan

[21] Appl. No.: 933,117

[22] Filed: Aug. 9, 1978

[30] Foreign Application Priority Data

Aug. 12, 1977 [JP] Japan .................. 52-108408[U]

[51] Int. Cl.³ .................................................. B60C 5/12
[52] U.S. Cl. .................................................. 152/400
[58] Field of Search ............... 152/375, 378, 379.1, 152/379.2, 379.5, 396–398, 411, 412, 413, 381.5, 381.6, 330 RF, 382, 383, 386, 399, 400, 401, 152, 279, 283, 307, 388

[56] References Cited

U.S. PATENT DOCUMENTS

| | | | |
|---|---|---|---|
| 1,501,399 | 7/1924 | Hannan et al. | 152/152 |
| 2,383,577 | 8/1945 | Zarth | 152/400 |
| 2,400,930 | 5/1946 | Herzegh | 152/400 |

FOREIGN PATENT DOCUMENTS 696213 12/1930 France .................. 152/152

Primary Examiner—H. Grant Skaggs
Attorney, Agent, or Firm—Haseltine, Lake & Waters

[57] ABSTRACT

A safety wheel with a rim having a tubeless tire mounted on the rim about its periphery. The rim is formed with flanges and an air chamber defined by the rim and the tubeless tire, has a bead stopper disposed within the said air chamber for gripping portions of the tubeless tire in cooperation with the flanges so to contain the bead portions against axial displacement relative to the rim. The bead stopper has a plurality of rigid circular bead stopper units flexibly connected in a radial direction to form an endless configuration with an inner peripheral surface fitted into a rim base on the rim. One of at least a pair of interconnected bead stopper units is formed at one end with a male connecting section having connecting pins, and anotjer end is formed with a female connecting section having hook-like locking concave portions. The locking concave portions and connecting pins of the female and male respectively being disengageably connected to each other.

2 Claims, 5 Drawing Figures

SAFETY WHEEL

BACKGROUND OF THE INVENTION

The present invention relates to a safety wheel of a simple construction in which bead portions of a tubeless tire are firmly held in position.

Safety wheels heretofore known, have been designed so that a bead stopper is inserted into an air chamber surrounded by a tubeless tire and a rim. Bead portions of the tubeless tire are held in position by the bead stopper and rim flanges of the rim. In such a safety wheel, it is desirable that the bead stopper cooperates with the rim to firmly grip the bead portions of the tubeless tire so that they may be positively held against any displacement in an axial direction of the wheel. This is especially so during turning of the vehicle and even when the tire is punctured. Furthermore, the bead stopper does not radially advance even when the vehicle is running at a high speed. Also, the bead stopper may be easily assembled, and particularly incorporated in position.

SUMMARY OF THE INVENTION

The main object of the invention is to overcome the defects of the prior art.

Still another object of the present invention is to provide a safety wheel of a simple construction.

The principal feature of the present invention is directed to a safety wheel apparatus comprising: a rim, a tubeless tire mounted on said rim about the periphery thereof, said rim being formed with flange means; an air chamber defined by said rim and said tubeless tire, a bead stopper disposed within said air chamber for gripping bead portions of said tubeless tire in cooperation with said flange means of said rim to contain said bead portions against axial displacement relative to said rim; said bead stopper being defined by a plurality of rigid circular bead stopper units flexibly connected in a radial direction thereof, so as to form an endless configuration with an inner peripheral surface thereof fitted into a rim base of said rim; one of at least a pair of interconnected bead stopper units being formed at one end with a male connecting section having connecting pins, and another end thereof formed with a female connecting section having hook-like locking concave portions, said locking concave portions and connecting pins of said female and male respectively being disengageably connected to each other.

The invention will be best understood with respect to the specification, claims and drawings.

IN THE DRAWINGS

DESCRIPTION OF THE INVENTION

Figure 1:
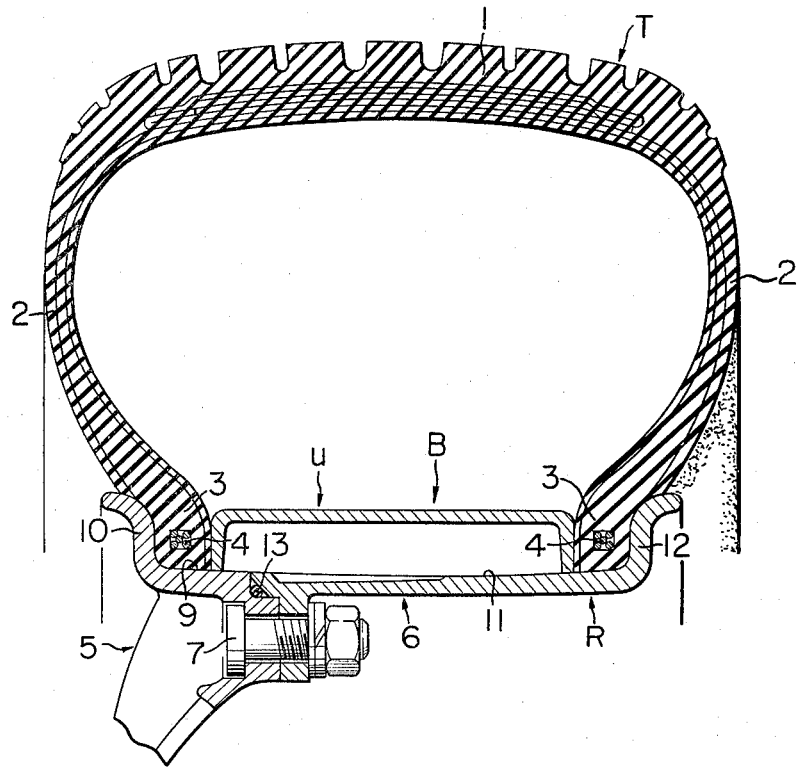
FIG. 1 is a partially radial cross section of a safety wheel according to the present invention.

Referring to FIG. 1, which is a vertical section showing a part of a safety wheel in accordance with the present invention, the safety wheel comprises a tubeless tire T, a divided rim R and a bead stopper B.

The tubeless tire T is of a previously known symmetric structure including a tread portion 1, side wall portions 2, 2 extending integrally from the opposite sides of the tread portion 1, and bead portions 3, 3 extending from the respective side wall portions 2, 2 integrally therewith in gradually increasing thickness relative thereto, the bead portions 3, 3 respectively having bead wires 4 embedded therein.

As to the structure of the divided rim R, it will be observed that an outboard rim 5 and an inboard rim 6 are connected and fastened together into an integral unit by means of a plurality of fastening bolts 7. The outboard rim 5 includes a body portion having a rim base 9 of relatively narrow width and a rim flange 10 integrally formed along the outer edge of the body portion to serve the purpose of holding the adjacent bead portion 3 of the tubeless tire T in place. On the other hand, the inboard rim 6 includes a body portion having a rim base 11 of relatively large width and a rim flange 12 integrally formed along the outer edge of the body portion 3. An O-ring 13 is interposed between the contacting faces of the outboard and inboard rims 5 and 6 at a location outside of the fastening bolts 7.

The structure of the bead stopper B is described with reference to FIGS. 2 to 5. The bead stopper as illustrated consists of an endless train of bead stopper units or elements u, u . . . radially and flexibly interconnected. Since these bead stopper units u, u . . . are of similar construction, only one of them will be described.

Figure 2:
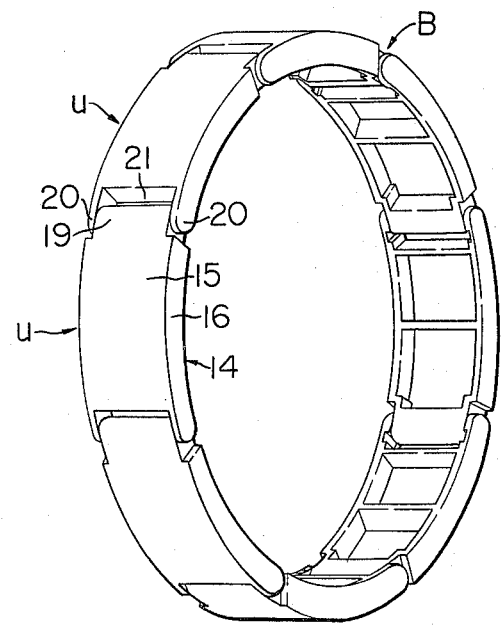
FIG. 2 is a perspective view of a bead stopper.
Figure 3:
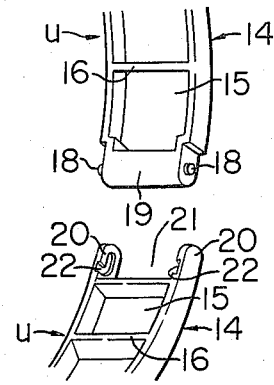
FIG. 3 is a perspective view of the bead stopper in disjointed state.
Figure 4:
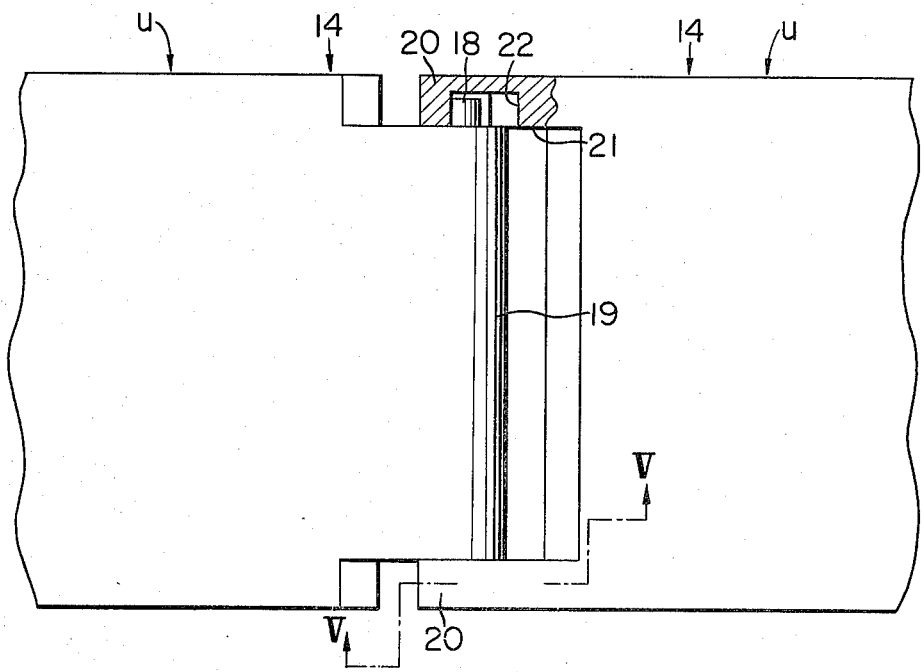
FIG. 4 is a plan view showing a part thereof.
Figure 5:
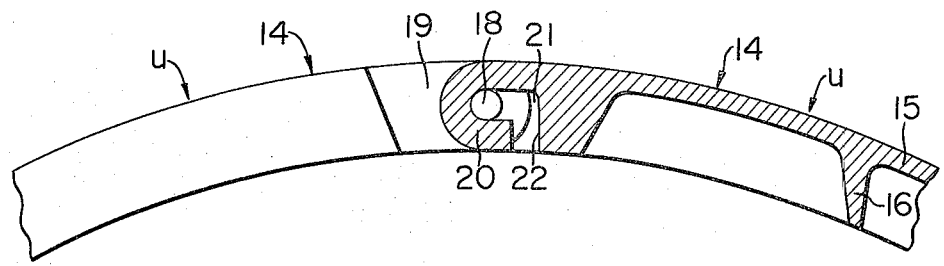
FIG. 5 is a sectional view taken on line V—V of FIG. 4.

A body portion 14 having a circular plate member 15 reinforced by a reinforcing frame 16 serves to retain sufficient rigidity particularly in the transverse direction. The body portion 14 has at one longitudinal end thereof formed with a male connecting portion 19 provided with projecting connecting pins 18 on the opposite sides thereof whereas; at the other longitudinal end thereof, there is provided a female connection portion 21 provided with a pair of projecting lugs 20, the lugs 20 are internally formed with hook-like locking concave portions 22. When the male connecting portion 19 of one stopper unit u is fitted into the female connecting portion 21 of the other bead stopper unit u and the connecting pins 18 are placed in engagement with the hook-like locking concave portions 22 as shown in FIGS. 4 and 5, these two bead stopper units u may be disengagably connected in a radially flexible manner. Thus, when a plurality of bead stopper units u is successively connected in the procedure as described above, an endless bead stopper B may be assembled as shown in FIG. 2.

By way of further description, the process of incorporating the constructed bead stopper B into the tubeless tire T has the bead stopper B inserted into the tubeless tire through an opening in an inner peripheral surface thereof. In this case, each bead stopper unit u may be freely flexed radially in order to be contracted in the same direction so that the bead stopper B may be incorporated into the tubeless tire T without difficulty. After the bead stopper B has been incorporated into the tubeless tire T, the above-mentioned divided rim R composed of the outboard rim 5 and the inboard rim 6 is incorporated through the opposite sides of the tubeless tire T and the outboard and inboard rims are connected by a plurality of connecting bolts 7. As a result, a flat cylindrical surface comprising the rim bases 9 and 11 of the outboard and inboard rims 5 and 6 is fitted in the inner peripheral surface of the bead stopper B, so that both the bead portions 3 of the opposite sides of the bead stopper B and the rim flanges 10 and 12 of the divided rim R serve to maintain airtightness between the tubeless tire T and the divided rim R.

While the description has been given, in the foregoing embodiment, of the case in which all bead stopper units u each have formed at one end thereof a male connecting portion 19 provided with connecting pins 18 whereas at the other end thereof is formed with a female connecting portion 21 provided with hook-like locking concave portions 22. It should be understood that in the present invention, one of the pair of bead stopper units u to be interconnected may be formed with the male connecting portion 19 whereas, the other formed with the female connecting portion 21 to be interconnected therewith.

In accordance with the present invention, as described above, the bead stopper is provided with a plurality of circular bead stopper units or elements, radially flexibly connected together into an endless configuration. The inner peripheral surface of the bead stopper is fitted in the rim base of the rim. In addition, one of at least a pair of bead stopper units is at one end thereof formed with a male connecting portion. The other thereof is formed with a female connecting portion provided with hook-like locking concave portions so that the locking concave portions and the connecting pins of the female and male connecting portions, respectively, may be disengageably connected. With this construction, the bead stopper is smaller in diameter than the inner peripheral diameter of the tubeless tire to be contracted in a radial direction so that the bead stopper may be inserted into the tubeless tire in an extremely simple and easy manner. After being inserted into the tubeless tire, the bead stopper may be radially expanded and simply and accurately incorporated in position within the tubeless tire. The bead portions of the tubeless tire may be positively gripped in cooperation with the rim flanges of the rim without possible radial expansion thereof even if a centrifugal force is applied thereto.

Moreover, the bead stopper may be simply assembled and disassembled or incorporated into the tubeless tire without using any tool.

As described above in connection with the preferred embodiment, if all bead stopper units are each formed with a female and male connecting portion, they are all to have the same construction. As a consequence, assembly can be easily made; parts can be easily replaced when they are damaged or broken; and since structure can be integrally molded, it is easy to manufacture the structure with the above-mentioned identical construction, making it possible to reduce the manufacturing cost.

Many modifications and variations of the present invention are possible in light of the above teachings. It is, therefore, to be understood that within the scope of the appended claims, the invention may be practiced otherwise than as particularly described.

What is claimed is:

1. A safety wheel apparatus employing, a tubeless tire mounted on a rim about the periphery thereof, said rim being formed with flange members; an air chamber defined by said rim and said tubeless tire, a bead stopper disposed within said air chamber for gripping portions of said tubeless tire in cooperation with said flange members to contain bead portions of said tire against axial displacement relative to said rim; said bead stopper being defined by a plurality of interconnected rigid circular bead stopper units, one of at least a pair of said interconnected bead stopper units being formed at one end with a male connecting section having connecting pins, and another end thereof formed with a female connecting section having hook-like locking concave portions, said locking concave portions and connecting pins of said female and male section respectively, being disengageably connected to each other, wherein: said bead stopper units are flexibly connected in a radial direction thereof so as to form an endless configuration with an inner peripheral surface thereof fitted into a rim base of said rim; said rim being further defined by an outboard section with a body portion formed by a base of narrow width and a first flange member integrally formed along an outer edge of said portion and an inboard section with a body portion formed by a base of a width greater than said body portion of said outboard section and a second flange member integrally formed along an outer edge of said inboard body portion, said outboard and inboard portions being respectively affixed to one another by bolt means to enable cooperative placement with said bead stopper.

2. A safety wheel apparatus as claimed in claim 1, wherein: said bead stopper being flexible in a radial direction so as to be within an inner periphery of said tire for disposition into said tire while being expansible, after such disposition, to an inner diameter larger than an outer periphery of said rim base.

* * * * *